United States Patent [19]
Cabero

[11] 3,773,070
[45] Nov. 20, 1973

[54] WATER-INLET CONTROL VALVE

[76] Inventor: Eligio Franco Cabero, No. 182 Local E 7, Puebla, Mexico

[22] Filed: Nov. 3, 1971

[21] Appl. No.: 195,146

[30] Foreign Application Priority Data
Apr. 1, 1971  Mexico .................................. 126301

[52] U.S. Cl. ................................ 137/430, 137/441
[51] Int. Cl. ............................................ F16k 31/26
[58] Field of Search ................... 137/424, 426, 429, 137/430, 434, 436, 437, 440, 441, 442, 444, 137/449

[56] References Cited
UNITED STATES PATENTS
| | | |
|---|---|---|
| 1,005,044 | 10/1911 | Koch .................................. 137/445 |
| 1,589,786 | 6/1926 | Bradshaw ............................ 137/444 |
| 1,725,875 | 8/1929 | Luhr .................................. 137/429 |
| 2,604,113 | 7/1952 | Barsano .......................... 137/444 X |
| 2,664,261 | 12/1953 | Stephany ........................ 137/445 X |
| 3,104,677 | 9/1963 | Fleckenstein et al. ........... 137/434 X |

Primary Examiner—Martin P. Schwadron
Assistant Examiner—David R. Matthews
Attorney—Brenner et al.

[57] ABSTRACT

A water-inlet control valve, suitable to be used with a toilet water tank is disclosed. Said valve effects the control on the water-inlet by means of a sphere which bears against a circular gasket upon being pulled-up by a lever fastened to a pivot and actuated by means of a sliding shaft connected to a floating member, so as to restrain the passage of a water flow through the valve when the water level at said tank is at a predetermined height.

4 Claims, 3 Drawing Figures

WATER-INLET CONTROL VALVE

BACKGROUND OF THE INVENTION

1. Field of the Invention

This invention relates to a valve suitable for controlling the water inlet, of the anti-siphon type, directly connected to a water supply, so as to stop the water inflow when the water level in a reservoir reaches a predetermined height.

2. Prior Art

Although there are known presently a number of different types of control valves for water reservoirs, such as a toilet tank, all of them are subjected to wear of the valve seat and, accordingly, leaks are frequent. Furthermore, in almost all the available types of such valves, the water output through the same is incrementally reduced as the desired level is being reached in the reservoir thus resulting in an increased filling time for the reservoir.

SUMMARY OF THE INVENTION

The above and other disadvantages of the prior art valves are obviated through the present invention, which provides an anti-siphon type valveformed by a circular gasket and a spheric body bearing thereagainst providing a perfectly tight seal and actuated by a lever which, upon movement of a floating means located at the opposite end thereof, moves a thrust bolt at the top of which is located said sphere.

Therefore, it is an object of the present invention to provide such a valve which, due to the special construction thereof, does not cause wear of the gasket nor result in leaks.

It is another object of this invention to provide said type of valve, wherein the motion of the valve itself is guided so as to avoid misalignments.

Another further object of this invention is to provide said type of valve wherein the incremental reduction of the water output is avoided.

These and other further objects and advantages of the present invention will be partially evident and partially will become obvious to those skilled in the art upon a reading of the following detailed description of a preferred embodiment thereof, made with reference to the accompanying drawings, forming a material part hereof.

BRIEF DESCRIPTION OF THE DRAWINGS

As it will be obvious, like reference characters are used through the several views to show like parts of the valve.

DESCRIPTION OF A PREFERRED EMBODIMENT

Figure 1:
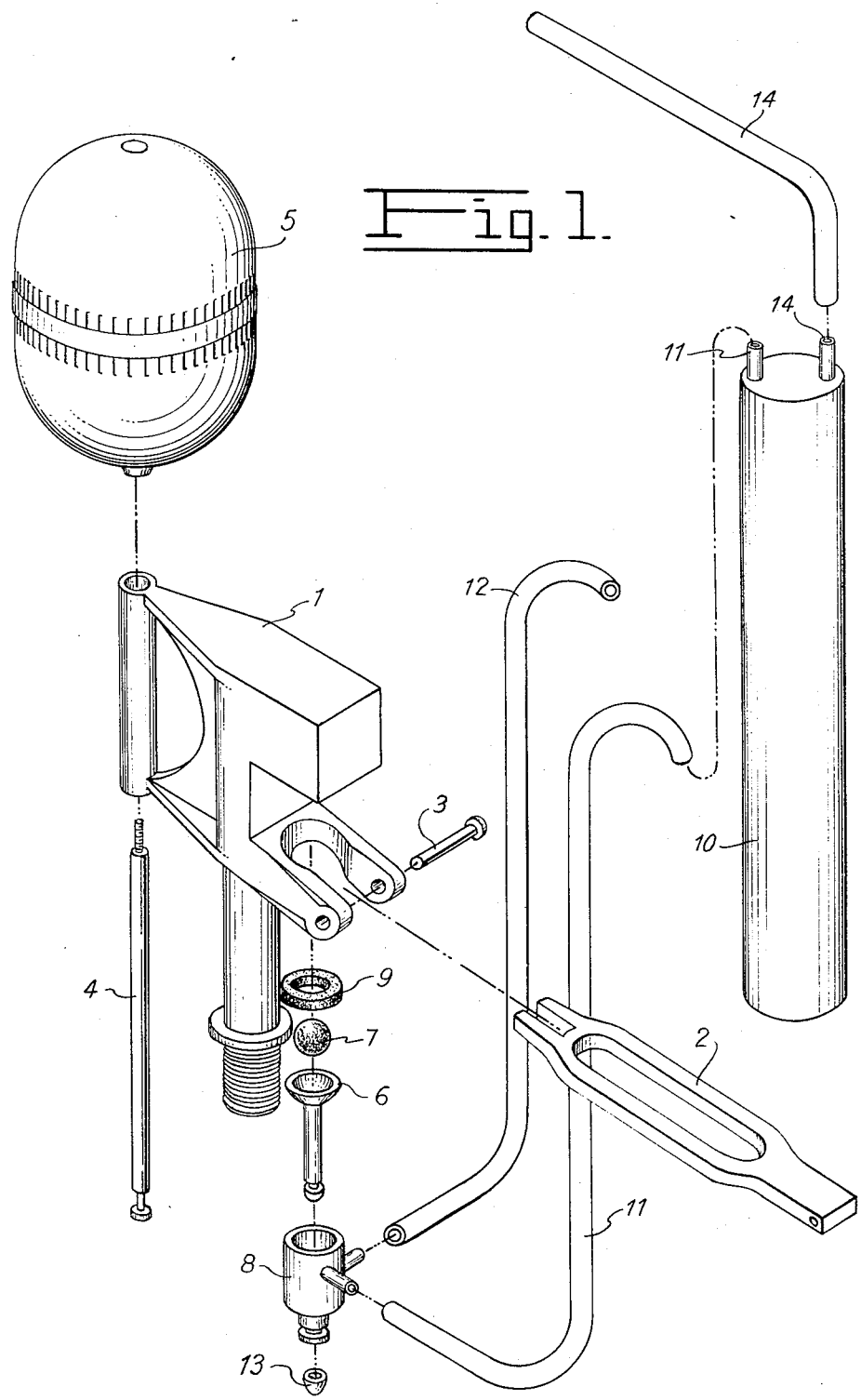
FIG. 1 is a perspective view showing an exploded illustration of the components of a valve of the present invention.

The water-inlet control valve of this invention is hereinbelow disclosed with reference to a toilet tank, as connected directly to the water line. In this valve, the control is effected by means of a sphere bearing against a circular gasket when actioned by a lever connected at the one end by a pivot pin, while the other end is moved by a shaft suitably guided by a number of bushings. Said shaft has at the contrary end to said lever, a floating means which, upon upward motion, provides the necessary power to effect the water seal at the gasket. By the contrary, when the water body is discharged from the tank, said floating means no longer will exert its action against the lever, thus permitting the reverse action of the sphere, which provides for the water entrance through a tube or hose to be discharged to an anti-siphon tube, until the water lever provides again the floating means action in order to re-close the valve.

Making reference to the figures, said valve is formed by a valve body 1, wherein a lever 2 is connected by a pivot pin 3, while at the contrary end it is assembled a shaft 4 of a floating means 5; said shaft, in turn, sliding within a bushing B, forming part of the valve body 1 itself; and with the shaft assembly being completed by said floating 5 at the upper end of said shaft. The thrust bolt 6 is introduced into the bolt guide C, and above the same there is a seal sphere 7.

At the exit of the valve body 1 there is threaded a vessel 8 which, in turn, supports at its upper threaded portion, a gasket means 9 on which the sphere 7 sealing is effected. On the other side of the valve body, onto the side of said vassel 8 a hose or tubing 11 is connected, which will discharge water to the top of the anti-siphon tube 10, near the hose or tube 11 for the refilling of water, wherein there is an additional exit 12, in order to feed the water level required as a water mirror at the bowl.

In the lower part of said vessel 8 there is connected a seal 13 permitting the tight closure when the thrust bolt 6 has the same fastened thereto, thus preventing the water entrance into the vessel 8, from the tank. The antisiphon tube 10 contains a hose or tubing 14, which provides for the back-pressure interruption inside the anti-siphon tube 10. At the lower portion of the valve body 1 there is a theaded bushing 15, permitting the coupling or assembling thereof to a tank. Said coupling will be complemented with a flexible gasket 16 and a nut 17 as well as a nut 18 for the connection to the water feeding tubing.

Figure 2:
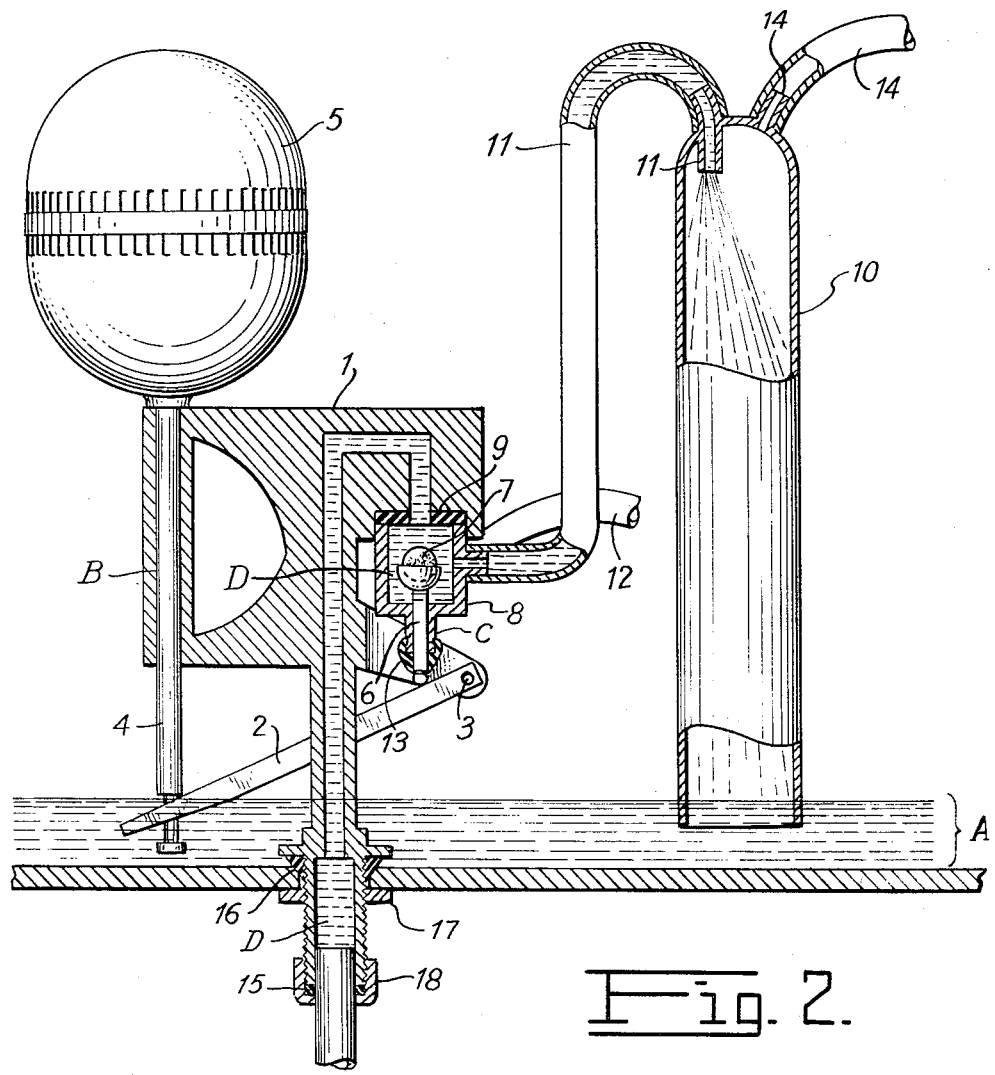
FIG. 2 is a longitudinal section showing the components of the valve, and the water admittance position thereof.

The assembly of the valve above described, operates as follows:

Making reference to FIG. 2, water will be flowing into the reservoir or tank through a duct or bore D, without an obstacle in the flow thereof, since the sphere will be at the lower part of the vessel 8, thus leaving a free pathway for the water inflow.

Figure 3:
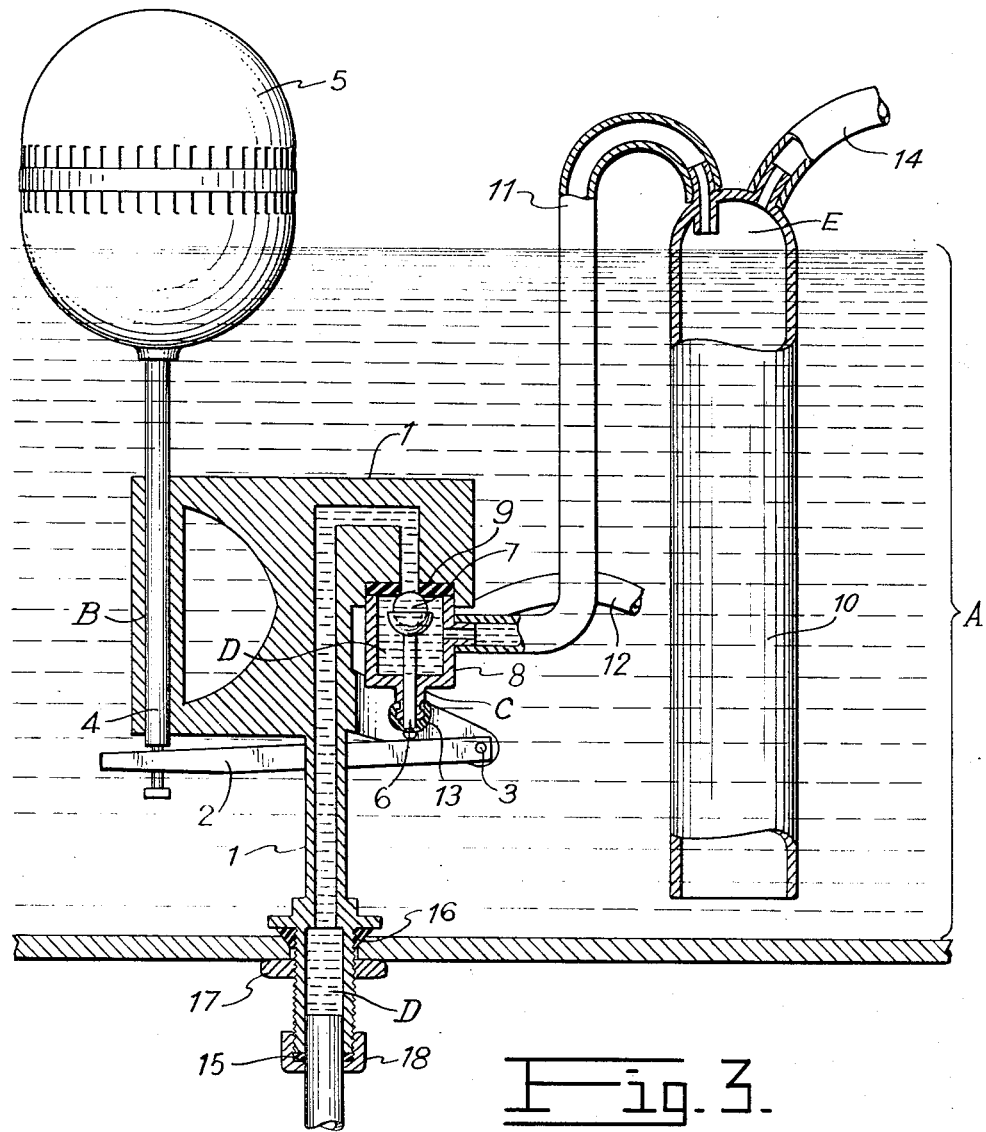
FIG. 3 is a longitudinal section similar to FIG. 2, showing the sealing position of the valve.

With reference to FIG. 3, when the level of water inside the reservoir or tank reaches a predetermined height A, the floating will be pushed upwardly, due to the water volume displaced thereby, thus actuating said lever 2 connected, at the other end thereof, to the pivot pin 3; this action resulting in a rising of said thrust bolt 6 which, in turn, will push upwardly said sphere 7 against the gasket 9, thus making a tight seal, whereby the water inlet to the anti-siphon tube 10 will be prevented.

The water level inside the tube 10 will be the same as the water level in said reservoir or tank A. When the water inlet through the tubing or hose 11 is at a high level as the water level A existing both in said tank and in said tube 10, an air chamber will be formed E, which will impair the siphoning or return of water into the line 11 and, accordingly, into the entire water column from the feeding D. Said air chamber E can be fed from the outer of the tank through a tube or hose 14, in order to avoid the water pollution at the lines due to the trapped air inside the tank.

It will be obvious that many changes and modifications can be made to the above disclosure by those skilled in the art; and therefore, it is intended that the only limits to the scope of the invention will be as per the true scope of the appended Claims.

What is claimed is:

1. A valve for controlling the water inlet and antisiphon means assembly adapted to be used with a toilet water tank, comprising:

a valve body carrying an inner water inlet conduit;

an actuating lever connected at one end thereof to said valve body by means of a pivot pin and disposed under said valve body;

a shaft connected to the opposite end of said lever;

a floating means connected to the upper end of said shaft, opposite to said end connected to said lever;

bushing means adapted to guide said floating means in its upward and downward displacement, serving as a guide for the vertical displacement of said shaft;

a thrust bolt disposed in contact with said lever at a point between said pivot pin and the connection point to said shaft whereby when said floating means is moved a motion of said thrust bolt upwardly or downwardly is effected as a consequence of the change in water level;

a vessel disposed inside the valve body and arranged to be penetrated by said thrust bolt from underneath;

a sphere means inside said vessel, said sphere means being supported freely on the upper end of said thrust bolt by a hollow hemispheric support;

a seat means located at the outlet of said inner water inlet conduit and disposed to cooperate with said sphere means;

whereby an upward thrust of said floating means is converted into a pushing force for closing said outlet of the inner water inlet conduit by a cooperating action of said sphere and said seat means, said sphere means being pushed against said seat means with a force sufficient to overcome the pressure of said incoming water;

a tubular element directly connected to said vessel, said tubular element being vertically arranged and with its lower end open and its upper end closed;

means for water entrance at the upper closed end of said tubular element;

means for air entrance at the upper closed end of said tubular element;

said water and air entrance means being disposed at such an angle that the water discharged inside said tubular element will not be expelled through said air entrance means;

said tubular element being arranged with its upper end above the maximum water level in order to form an air chamber communicating with said air entrance means; and a connecting means for connecting said air entrance means to an air intake point remote from said valve to permit non-polluted air to be fed into said air chamber.

2. An assembly according to claim 1 including a tubular means connecting said vessel with an overflow tube for maintaining a predetermined water level in a portion of a reservoir related thereto.

3. An assembly according to claim 1 wherein said seat means is substantially circular in form and is formed of an elastic material.

4. An assembly according to claim 1 wherein the valve elements are made of plastic.

* * * * *